Patented Oct. 16, 1945

2,386,804

UNITED STATES PATENT OFFICE 2,386,804

SOLIDIFIED NORMALLY LIQUID MATERIALS

Albert Joseph Laliberte, Naugatuck, Conn., assignor to Safety-Fuel Incorporated, West Cheshire, Conn., a corporation of Connecticut No Drawing. Application March 18, 1942,
Serial No. 435,164

6 Claims. (Cl. 44—7)

This invention relates to new and useful improvements in solidified normally liquid materials.

In accordance with the invention a voluminous gel of a metallic soap substantially insoluble or limitedly soluble in the liquid to be solidified is created in situ in such liquid by reacting a solution in such liquid of a suitable organic compound with a suitable saponification agent suspended in said liquid in substantially dry pulverulent form, and permitting the reaction to proceed in at least the last stages thereof while the reaction mix is in substantially quiescent condition.

The saponification reaction may be one of either acid neutralization or of double decomposition. The suspension of saponification agent must be maintained substantially stable during at least the quiescent stage of the reaction, i. e., no appreciable segregation of suspended particles should occur upon discontinuance of agitation. This may be accomplished by the formation of a portion of the soap gel to a point at which the viscosity imparted to the mix by the gel is sufficient to substantially maintain the particles in suspension while the mix is quiescent and in the limiting case by a suspension of particles of saponification agent of such fineness that the same remain suspended substantially without presence of soap gel. In any case, however, viscosity of the mix and particle size of saponification agent must be so coordinated at the beginning of the quiescent reaction stage that no appreciable segregation of particles of saponification agent occur during that stage. Except in the limiting case referred to agitation of the mix should be resorted to until the desired point of viscosity in the mix obtains.

In some cases it is of advantage to initiate or expedite the saponification reaction by heating the solution containing the reactants for a short period of time to a temperature above normal, or, alternatively, procure the mixing of the reactants at such temperature. Depending upon the reactants used the temperature requirements may vary. In some cases a temperature of about 40° C. may suffice, while in other cases materially higher temperatures must be resorted to. The reaction mix is preferably agitated and the reaction temperature substantially maintained until gel formation therein has proceeded to the desired point of viscosity. Heating and agitation may then be discontinued and the reaction will proceed while the mix is substantially quiescent at a more or less rapid pace. The fact that it is possible to utilize agitation within the first part of the procedure is of advantage in accordance with the invention as it permits the saponification agent to be mechanically suspended throughout the first stage of the reaction. Once gel formation of the type mentioned is obtained, the mass may be introduced into containers in which it will thereafter solidify by itself. Completion of the solidification while the mix is substantially quiescent is of prime importance as the disturbance by agitation of the reaction mass during at least the last stages of congelation is detrimental to the desired characteristics and particularly to the homogeneity of the solidified product.

The normally liquid material that may be solidified in accordance with the invention may be any suitable liquid provided the same will dissolve the organic compound herein referred to at least to the extent capable of yielding the desired metal soap gel. The liquid material should be further such as is substantially neutral to such organic compound. The same should also be substantially neutral with respect to the saponification agent prescribed in accordance with the invention or should be at least such that the saponification reaction in accordance with the invention can be carried out under conditions assuring substantial neutrality with respect to the liquid material. In accordance with the invention such liquid materials as aliphatic and aromatic hydrocarbons and particularly hydrocarbon cuts of petroleum oil distillates, ethers, esters, halogenated hydrocarbons, and the like, may be solidified.

The organic compound of the afore-mentioned type is preferably one of the aliphatic acid or acid salt series, carrying at least one carboxyl or carboxyl metal group in aliphatic chain linkage, the aliphatic chain in either case having preferably at least 12 carbon atoms in said chain. The organic compound in accordance with the invention may thus comprise either an organic acid salt or free organic acid of the above-mentioned type and nature. If the same is an organic acid, the saponification reaction is one of neutralization of the acid with the saponification agent. On the other hand, if the organic compound is a salt, the saponification reaction will be one of double decomposition between the organic acid salt and the saponification agent. Organic acids useful in accordance with the invention are, for instance, stearic acid, oleic acid, palmitic acid, abietic acid and the like. In many instances the commercial forms of these acids may be used, such as, for instance, rosin or the products obtained by the splitting of fats and containing a mixture of palmitic, stearic, and oleic acids in varying proportions. Commercial products of this type are, for instance, coconut oil fatty acids, peanut oil fatty acids, palm oil fatty acids, and the like. For best results I have found it of advantage to use rosin or stearic acid or a mixture thereof. Organic salts that may be used in the practice of my invention are, for instance, the metal salts of any of the herein enumerated organic acids or mixtures of organic acids in which the metal is capable of exchange with the metal of the saponification agent.

The saponification agent of the type hereinabove referred to may be any agent which is capable of neutralizing the organic acid present in the solution of liquid material to be solidified or reacting with a suitable metal salt of such organic acid by way of double decomposition as the case may be. The saponification agent should in all cases be such as is capable of forming with the organic compound in accordance with the invention a voluminous metallic soap gel insoluble or limitedly soluble in the liquid material to be solidified. Good results are preferably obtained with hydroxides and alcoholates and suitable saponification agents of this type, useful in accordance with the invention, are, for example, sodium hydroxide, sodium alcoholates, and the like.

In some cases I prefer to suspend the saponification agent in accordance with the invention in substantially anhydrous pulverulent finely dispersed form in the solution containing the organic acid with the use of a colloid mill or other device for procuring finest dispersion. It is also sometimes of advantage and desirable to initiate or expedite the saponification reaction by passing the reaction mix through such dispersion device.

The alcoholates are preferably the salts of monohydric and polyhydric alcohols carrying the hydroxy group in aliphatic chain linkage. Examples of such alcohols are, for instance, the simple alcohols of the aliphatic series, such as methyl, ethyl, propyl, iso-propyl, butyl, iso-butyl, and the like alcohols. Examples of suitable polyhydric alcohols are, for instance, the glycols. The alcoholate formation may be accomplished by the dissolution of a suitable metal such as metallic sodium in the alcohol. Whenever possible, however, such as in the case of simple aliphatic alcohols as, for instance, methyl alcohol, ethyl alcohol, and the like, I prefer to obtain alcoholate formation by adding to a strong and concentrated alcohol, a suitable solid anhydrous metal hydroxide such as sodium hydroxide with subsequent evaporation of excess alcohol. When proceeding in this manner, I prefer to use an alcohol concentration of in excess of 90% and preferably in excess of 95% and preferably equimolecular proportions of alcohol and hydroxide.

The amount of reagents used within the practical application of my invention should be preferably so adjusted that the organic compound and liquid material to be solidified are present in a ratio sufficient to solidify substantially all of the liquid material present with the soap gel formed. As a general rule 4% to 10% of the organic compound will accomplish this result. The saponification agent should be present in amount sufficient to accomplish the saponification, which, as a rule, requires in excess of stoichiometric amounts. When using alcoholates containing crystal alcohol, care should be taken that the alcohol content is considered in calculating the required amount of saponification agent. The following is a practical example in accordance with the invention given by way of illustration but not of limitation.

Example I

A petroleum hydrocarbon cut of a boiling range of 145° to 210° F. was used. 5% of stearic acid was dissolved in this hydrocarbon. 1.2% of sodium methylate (calculated as crystal alcohol free) produced by evaporating to dryness a mixture of approximately equal parts by weight of substantially anhydrous sodium hydroxide and anhydrous methyl alcohol, was thereupon added to the hydrocarbon solution of the stearic acid. The reaction mass was heated for a short period of time and the temperature maintained at approximately 40° C. with agitation until gel formation had proceeded to a point where no stratification or segregation of saponification agent occurred upon interruption of the agitation. The sodium methylate was added to the organic acid hydrocarbon solution in finely pulverized dry form and kept in fine suspension therein by means of the agitation. Upon gel formation as described the reaction mass was poured into fuel containers in which it solidified without any further manipulation. Solidification proceeded very rapidly, being substantially accomplished within a period of 15 to 20 minutes.

In certain instances where the reaction seems to be delayed or to proceed with difficulty, even though the mass is heated to the reaction temperature, a comparatively small amount of alcohol, say from 0.5 to 1.5% will initiate or expedite the reaction. Such addition of alcohol is particularly beneficial in the case of rosin and allied compounds. A procedure of this type is, for instance, set forth by way of illustration in the following example:

Example II 6.0% of rosin was dissolved in the same petroleum hydrocarbon cut as set forth in Example I. 1.2% of sodium methylate and .9% of methyl alcohol were added to the solution whereupon the reaction mass was treated in the same manner as described in Example I.

Instead of hydrocarbons, specified in the foregoing examples, other liquid materials may be used in the solidification procedures there recited. Thus, for instance, the lower aliphatic esters, such as ethyl ether, ketones, such as acetone, esters, such as ethyl acetate, chlorinated hydrocarbons, such as carbon tetrachloride, chloroform and the like may be thus solidified.

The products obtained in accordance with the invention are in the majority of cases substantially homogeneous and firm, can be cut with a knife and handled as ordinary solids. The products will not liquify when subject to raised temperatures and in case the solidified normally liquid material comprises a combustible liquid, the products will burn without melting. The products are further characterized by the fact that the normally liquid material which they contain may be recovered in substantially unadulterated form by the application of pressure, centrifugal manipulations, distillation, or the like. Alternatively, the normally liquid material contained in the products in accordance with the invention in solidified form may be recovered by separation with the aid of suitable solvent extraction. In such case the extracting solvent is preferably one in which the metallic soap is preferentially soluble and in which the normally liquid material in the solidified product is but limitedly soluble or substantially insoluble. In most instances the latter type recovery of liquid material may be procured by slushing the solidified products made in accordance with the invention, with water.

The products in accordance with the invention are further characterized by a considerable density and represent essentially a substantially solid system predominantly composed of the normally liquid material and the metallic soap. The solidified products are substantially free from voids and have a bulk specific gravity, i. e., specific gravity of the entire product, equivalent to at least the specific gravity of the normally liquid component and preferably a bulk specific gravity approximately equivalent to the total weight of the components divided by the total volume of the components. By reason of their density and characteristics of structure the solidified products contain a high volume percentage of normally liquid material.

In the preparation of solidified products as hereinabove set forth, the particular organic compound or acid used in the saponification reaction may sometimes yield a product of a more or less heavy viscous molasses-like structure. This condition may be for instance encountered when using oleic acid. Though the resulting products are satisfactory for most purposes and will not melt but on the contrary will become increasingly more solid when heated, it is as a general rule particularly for shipping and handling purposes, desirable to obtain greater solidity of the compound. In most cases the lack in desired solidity can be remedied by using the particular organic compound or acid in question together with an organic compound or acid of the type yielding solidified products of a high degree of viscosity. By a proper proportioning of such organic compound or acid mixture any desired intermediate solidity can be procured. For example where oleic acid is to be used in the saponification reaction it is preferred to use a mixture of oleic acid with stearic acid or rosin.

The foregoing description is furnished by way of illustration and not of limitation and it is, therefore, my intention that the invention be limited only by the appended claims or their equivalents wherein I have endeavored to claim broadly all inherent novelty.

I claim:

1. Method for solidifying normally liquid organic materials which comprises reacting, under conditions of substantial chemical inertness against the liquid material to be solidified, a solution in said liquid material, of an organic acid of the group consisting of fatty acids of at least 12 carbon atoms in aliphatic chain length and rosin acids substantially soluble therein and saponifiable to produce a voluminous metallic soap gel from limitedly soluble to insoluble in said liquid material with a saponification agent of the group consisting of sodium hydroxide and sodium alcoholate, suspended with agitation in said liquid material in substantially dry pulverulent form, reactable with said organic acid to thereby form said soap gel, and permitting the materials to remain substantially quiescent during at least the last stages of the reaction, the viscosity of the mix and the particle size of said saponification agent being so coordinated as to substantially maintain said saponification agent in suspension during at least said last reaction stages, agitation being discontinued not earlier than the point at which said coordinated viscosity is present.

2. Method for solidifying normally liquid organic materials which comprises reacting, under conditions of substantial chemical inertness against the liquid material to be solidified, a solution, in said liquid material, of at least one organic fatty acid carrying at least one carboxyl group in aliphatic chain linkage of at least 12 carbon atoms in such chain, being substantially soluble in said liquid material and saponifiable to produce a voluminous metallic soap gel substantially insoluble in said liquid material, with a saponification agent of the group consisting of sodium hydroxide and sodium alcoholate with agitation, suspended in said liquid material in substantially dry pulverulent form and of the type reactable with said acid to thereby form said soap gel, and permitting the materials to remain substantially quiescent during at least the last stages of the reaction, the viscosity of the mix and the particle size of said saponification agent being so coordinated as to substantially maintain said saponification agent in suspension during at least said last reaction stages, agitation being discontinued not earlier than the point at which said coordinated viscosity is present.

3. Method according to claim 2 in which said organic fatty acid is stearic acid.

4. Method for solidifying normally liquid organic materials which comprises reacting, under conditions of substantial chemical inertness against the liquid material to be solidified, a solution, in said liquid material, of at least one organic fatty acid carrying at least one carboxyl group in aliphatic chain linkage of at least 12 carbon atoms in such chain and saponifiable to produce a voluminous metallic soap gel substantially insoluble in said liquid material, with a saponification agent of the group consisting of sodium hydroxide and sodium alcoholate, suspended in said liquid material in substantially dry pulverulent form, of the type reactable with said acid to thereby form said soap gel, agitating the mix at least until the vicosity imparted thereby by a portion of the soap gel formed is sufficient to maintain the saponification agent in suspension while said mix is quiescent, discontinuing agitation before the completion of the saponification reaction, and permitting the mix to remain substantially quiescent during at least the last stages of the saponification reaction.

5. Method for solidifying normally liquid organic materials which comprises reacting under conditions of substantial chemical inertness against the liquid material to be solidified, a solution in said liquid material of stearic acid with a saponification agent of the group consisting of sodium methylate and sodium hydroxide type, suspended in said liquid material in substantially dry, pulverulent form, agitating the mix at least until the viscosity imparted thereto by a portion of the soap gel formed is sufficient to maintain the saponification agent in suspension while said mix is quiescent, discontinuing agitation before completion of the saponification reaction and permitting the mix to remain substantially quiescent during at least the last stages of the saponification reaction.

6. Method for solidifying normally liquid organic materials, which comprises reacting, under conditions of substantial chemical inertness, against the liquid material to be solidified, a solution in said liquid material, of a rosin acid saponifiable to produce a voluminous metallic soap gel substantially insoluble in said liquid material, with a saponification agent of the group consisting of sodium methylate and sodium hydroxide type, suspended in said liquid material in substantially dry pulverulent form, of the type reactable with said acid to thereby form said soap gel, agitating the mix at least until the viscosity imparted thereto by a portion of the soap gel formed is sufficient to maintain the saponification agent in suspension while said mix is quiescent, discontinuing agitation before completion of the saponification reaction, and permitting the mix to remain substantially quiescent during at least the last stages of the saponification reaction.

ALBERT JOSEPH LALIBERTE.

CERTIFICATE OF CORRECTION.

Patent No. 2,386,804.　　　　　　　　　　　　　October 16, 1945.

ALBERT JOSEPH LALIBERTE.

It is hereby certified that error appears in the printed specification of the above numbered patent requiring correction as follows: Page 3, second column, line 16, claim 2, after "alcoholate" insert a comma; line 17, same claim, for "with agitation, suspended" read --suspended with agitation--; line 62, claim 5, and page 4, first column, line 7, claim 6, strike out the word "type"; and that the said Letters Patent should be read with this correction therein that the same may conform to the record of the case in the Patent Office.

Signed and sealed this 29th day of January, A. D. 1946.

Leslie Frazer (Seal)　　　　　　　　First Assistant Commissioner of Patents.